United States Patent [19]

McConnell

[11] 3,856,889

[45] Dec. 24, 1974

[54] BLENDS CONTAINING POLYETHYLENE AND AN UNSATURATED POLYCARBOXYLIC ACID MODIFIED POLYOLEFIN

[75] Inventor: Richard L. McConnell, Kingsport, Tenn.

[73] Assignee: Eastman Kodak Company, Rochester, N.Y.

[22] Filed: Sept. 11, 1972

[21] Appl. No.: 288,205

[52] U.S. Cl. ....... 260/897 B, 260/45.95, 260/45.85, 260/45.75, 260/876, 117/155 UA, 117/161 UZ, 117/161 UC
[51] Int. Cl. ........................................... C08f 29/12
[58] Field of Search ....................... 260/897, 876 R

[56] References Cited
UNITED STATES PATENTS

| | | | |
|---|---|---|---|
| 3,284,380 | 11/1966 | Davis | 260/8 |
| 3,475,369 | 10/1969 | Blunt | 260/33.6 |
| 3,483,276 | 12/1969 | Mahlman | 260/897 |
| 3,658,948 | 4/1972 | McConnell | 260/897 B |

*Primary Examiner*—Murray Tillman
*Assistant Examiner*—C. J. Seccuro

[57] ABSTRACT

Blends containing polyethylene having good adhesion and coating properties are obtained by preparing a blend of polyethylene and modified polyolefins. These blends have good melt stability, good color and good adhesion to paperboards and inks and find particular use in curtain coating operations. These blends are also good hot melt adhesives.

7 Claims, No Drawings

BLENDS CONTAINING POLYETHYLENE AND AN UNSATURATED POLYCARBOXYLIC ACID MODIFIED POLYOLEFIN

This invention relates to blends containing polyethylene having improved adhesion to a substrate. One aspect of this invention relates to a blend of polyethylene and modified polyolefin which provides an improved coating resin. Another aspect of this invention is a blend of polyethylene and modified polyolefin useful as a hot melt adhesive.

For a number of years, various substrates, including paper, metal foil, fabrics, foodstuffs and the like, have been coated with paraffin or paraffin blends with ethylene vinyl acetate copolymer to preserve and protect the coated surface. In recent years, melt coating procedures, such as "curtain coating" have been employed to coat various substrates, particularly those of irregular shape. In this method, the substrate to be coated is passed through a "curtain" of molten wax which is provided by a spray head or other suitable means. The wax curtain, except when broken by the passage through it of a substrate, falls directly into a collector and is returned to a molten wax reservoir for reuse. Where a substrate to be coated is regular in shape, such as paper, fabric or the like, the wax can be applied to the substrate using a gravure roll immersed in a fountain coating. The molten coating composition can also be applied from a slit die onto the surface and smoothed with a doctor blade. The coated substrate can then be taken up on a rewind roll. Where the substrate has an irregular contour, for example, ham, bacon, nuts, bolts and the like, it is "curtain coated" by placing it on a moving belt or roller and passing it rapidly through a curtain of molten wax. The molten coating composition is cooled substantially simultaneously upon contact with the solid substrate which is usually at a temperature below the melting point of the coating composition.

The prior art paraffin compositions used in such coating processes have been satisfactory for forming coatings; however, these coatings do not exhibit the good physical properties including good clarity and sparkle, tensile strength, and toughness required for many applications. Other polymers, such as thermally degraded polyethylene waxes, as disclosed in U.S. Pat. No. 2,835,659, when coated on substrates, particularly paper or foil in thin layers, form brittle coatings which crack when flexed and have poor adhesion to the substrate. These prior art paraffin compositions and degraded polyethylene waxes also are not suitable as hot melt adhesives because of lack of tackiness which is necessary for an adhesive. It is apparent, therefore, that the state of the art will be greatly enhanced by providing a polyethylene containing blend which provides coatings having excellent physical properties and good adhesion to the substrate and which is also useful as a hot melt adhesive.

It is, therefore, an object of the present invention to provide blends containing polyethylene exhibiting improved properties.

Another object of the invention is to provide blends containing polyethylene having improved adhesion to a substrate.

A further object of this invention is to provide inexpensive blends containing polyethylene which provide coatings having excellent physical properties, as well as good adhesion to a substrate.

A still further object of the invention is to provide blends containing polyethylene useful as a hot melt adhesive.

Further objects of the invention will be apparent from the following description of the invention.

In accordance with this invention, blends containing polyethylene providing coatings having good physical properties and good adhesion to the substrate are obtained from a blend of polyethylene and modified polyolefins.

Polyethylenes suitable for use in the present invention include any of the low- and medium-density polyethylenes made by high pressure techniques well known in the art or blends of such polyethylenes. The preferred polyethylenes for these uses have densities ranging from about 0.90 to about 0.94 and melt viscosities ranging from about 5,000 to about 100,000 cp. at 190°C. However, for paper coating applications, polyethylenes may have melt viscosities as low as about 100 cp. at 190°C. The polyethylenes may be prepared directly to desired viscosity, or very high-molecular-weight resins may be thermally degraded to the desired viscosity. Also, suitable as polyethylenes for use in the present invention are ethylene containing telomer waxes prepared from ethylene and telogens, such as aldehydes, alcohols, and the like, also known in the art.

The modified polyolefins suitable for use in the present invention are prepared by reacting a polyolefin with an unsaturated polycarboxylic acid, anhydride or esters thereof.

The modified polyolefins are readily prepared according to the procedure described in U.S. Pat. No. 3,480,580 or U.S. Pat. No. 3,481,910. The polyolefins which can be modified are prepared from monoolefins containing at least 3 carbon atoms. Such polyolefins include homopolymers and copolymers of propylene, butene-1, 4-methyl-1-pentene, 3-methyl-1-butene, 4,4-dimethyl-1-pentene, 3-methylpentene-1, 4-methylhexene-1, 5-ethylhexene-1, 6-methylheptene-1, hexene-1, heptene-1, octene-1, nonene-1, decene-1, and dodecene-1 and the like.

The reaction of the polyolefin, which for ease of reaction is generally a low viscosity polyolefin, with an unsaturated polycarboxylic acid, anhydrides or esters thereof can be carried out in the presence of a free radical source. These homopolymeric or copolymeric low viscosity poly-$\alpha$-olefins are prepared by thermally degrading conventional high molecular weight $\alpha$-olefin polymers prepared by conventional polymerization processes. For example, one such suitable conventional polymer is the highly crystalline polypropylene prepared according to U.S. Pat. No. 2,969,345. Thermal degradation of conventional homopolymers or copolymers is accomplished by heating them at elevated temperatures causing the polymer chain to rupture apparently at the points of chain branching of the polymeric material. The degree of degradation is controlled by reaction time and temperature to give a thermally degraded low molecular weight crystallizable polymeric material having a melt viscosity range from about 100–5,000 cp. at 190°C. (ASTMD12 38-57T using 0.04 + 0.0002 inch orifice) and an inherent viscosity of about 0.1 to 0.5, [Schulken and Sparks, Journal Polymer Science 26 227, (1957)]. By carefully controlling the time, temperature and agitation, a thermally degraded poly-α-olefin of relatively narrower molecular weight range than the starting high molecular weight polymer is obtained. The degradation is carried out at a temperature from 290°C. to about 425°C.

The low viscosity poly-α-olefins are characterized by having a melt viscosity of less than about 100 to 5,000 cp. as measured at 190°C. (ASTM-D12 38-57T using 0.04 ± 0.0002 inch orifice). These low viscosity poly-α-olefins are reacted with unsaturated polycarboxylic acids, anhydrides or esters thereof at temperatures generally less than 300°C., preferably from about 150°-250°C. in the presence of free radical sources. Suitable free radical sources are, for example, peroxides such as ditertiary butyl peroxide, tertiary butyl hydroperoxide, cumene hydroperoxide, p-menthane peroxide, p-menthane hydroperoxide compounds or azo compounds, such as azobis(isobutyronitrile), or irradiation sources. Suitable irradiation sources include, for example, those from cobalt, uranium, thorium, and the like and ultraviolet light. Preferably, about 1 to 10 percent organic unsaturated polycarboxylic acid, anhydride or esters thereof, based on the weight of the low viscosity polyolefin, can be used. The amount of peroxide or free radical agent used is generally quite low being of the order of about 0.01 to about 0.5 percent based on the weight of the low viscosity poly-α-olefin. The reaction may be carried out either in a batchwise or in a continuous manner with contact times in the order of about 10 minutes to about 2 hours. Suitable unsaturated polycarboxylic acids and anhydrides are, for example, maleic acid, maleic anhydride, fumaric acid, citraconic anhydride, aconitric anhydride and itaconic anhydride. Suitable esters are, for example, the half or full esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example. These modified low molecular weight poly-α-olefin compositions have a melt viscosity of 100–5,000 centipoise at 190°C. and a saponification number of from at least 6 to about 60, preferably about 7–30. It has been observed that the melt viscosity of the product increases slightly. This increase in melt viscosity may be due to a slight degree of crosslinking or to copolymerization of the wax material with maleic anhydride.

The reaction of the polyolefin can also be carried out in an extruder or a Banbury mixer. This process can be used for reacting polyolefins having a melt viscosity greater than 5,000 cp. at 190°C. up to a viscosity of 500,000 cp. at 190°C. The modified polyolefins prepared in this manner, such as polypropylene, can have a melt viscosity of 150,000 cp. at 190°C. and a saponification number of up to 60.

The modified polyolefin or mixture of such modified polyolefins can be present in the blends of the present invention in an amount of from about 0.5 to about 25 percent, by weight, preferably about 1 to 10 percent, by weight. A blend of polyethylene and modified polyolefin having less than 0.5 weight percent modified polyolefin lacks adhesion and a blend containing more than 25 weight percent is brittle.

One method for the determination of saponification number of maleated polypropylene is as follows: Weigh approximately 4 g. of the sample into a 500 ml. alkali-resistant Erlenmeyer flask and add 1,000 ml. distilled xylene. Heat under a reflux condenser for 1 hour. Cool the solution to 75°C. or less, and add from a buret 30 ml. standardized 0.10 N KOH in ethyl alcohol. Heat under reflux for 45 min. Cool, and add from a buret standardized 0.10 N CH$_3$COOH in xylene until the mixture is acid to phenolphthalein. Add at least 1 ml. excess CH$_3$COOH. Reheat the solution under reflux for 15 min. Remove from heat, add 5 ml. water, and titrate to a faint pink end point with 0.10 N KOH in ethyl alcohol. Run a blank in this manner using the same amounts of reagents and the same heating times. Calculation:

$$\frac{[\text{For Sample } (\text{ml. KOH} \times N)\ (\text{ml. CH}_3\text{COOH} \times N)] - [\text{For Blank } (\text{ml. KOH} \times N)\ (\text{ml. CH}_3\text{COOH} \times N)] \times 56.1}{\text{g. Sample}} = \text{Sap. No.}$$

The unreacted, unsaturated polycarboxylic acid can be separated from the reaction mixture by purging the reaction mixture with an inert gas while the melt temperature is between 200° and 300°C. After the unreacted unsaturated polycarboxylic acid has been removed, the modified poly-α-olefin can be further purified by vacuum stripping, solvent extraction, or dissolving in a hydrocarbon medium and isolated by precipitation with a nonsolvent such as acetone.

One particularly useful modified polyolefin for use in the present invention is a maleated polypropylene having a saponification number of 30–60, and a melt viscosity of about 300–600 cp. at 190°C. One particularly useful polyethylene has a density of about 0.913 and a melt viscosity of 36,000 cp. at 190°C.

It may be desirable to use an effective polyolefin stabilizer in order to prevent gelation or degradation of blend properties of the polyethylene/maleated polypropylene blends in a curtain coating process or a hot melt applicator. Some suitable stabilizers include dilauryl thiodipropionate, butylated hydroxytoluene, dioctadecyl p-cresol, pentaerythritol tetrakis[3-(3,5-di-tert-butyl-4-hydroxyphenyl)propionate], dodecyl stearyl thiodipropionate, 2,2'-methylene bis(6-tert-butyl-p-cresol) and the like or combinations of such stabilizers. Desirable stabilizer concentrations include about 0.05 to about 1.0 percent of stabilizer, by weight, to the blend of polyethylene and modified polyolefin.

The blends of this invention are readily prepared in extruders, Banbury mixers, Brabender Plastographs or other conventional mixing equipment well known in the art.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Polyethylene having a melt viscosity of 36,000 cp. at 190°C. and a density of 0.913 was extruded into a curtain coating machine and circulated at 360°F. (182°C). Automobile head gaskets were supported on white, untreated paperboard, such as paperboard produced by Packaging Corporation of America and identified as Flo-Brite Paperboard and on a printed paperboard and packaged on a curtain coating machine with a film thickness of 5 mils. The films had virtually no adhesion to either plain or ink-treated paperboards and the films could be lifted from the packages without removal of any fibers from the paperboard.

After the polyethylene had been circulated in the machine for about 30 minutes, the viscosity of the melt began to increase, gel particles were visible in the melt curtain, and the pump used to circulate the melt began to labor. The friction in the pump caused the melt temperature to increase to 400°F. The melt was removed from the machine and it was necessary to flush with 150 pounds of polyethylene to remove all gel particles from the machine. This experiment demonstrates that unmodified polyethylene is not a suitable curtain coating resin due to poor melt stability and poor adhesion to plain or printed paperboards.

EXAMPLE 2

The following blends, as shown in Table 1, were prepared in a Brabender Plastograph with a melt temperature of 190°C. and rotor speed of 177 rpm. The increase in torque (from 140 to 175 in 36 minutes processing time) for Sample No. 1 again illustrates the unsuitability of unmodified polyethylene as a coating resin. Samples 2 through 7 demonstrate the polyethylene blends containing 2.5 to 5.0 percent maleated polypropylene and 0.1 to 0.5% pentaerythritol tetrakis[3-(3,5-di-tert-butyl- 4-hydroxyphenyl)propionate] have good processing characteristics, as well as good melt stability over a period of several hours. These blends retained good color. Pieces of paperboard, such as Flo-Brite paperboard, were coated with melt from Samples 1 through 7 using a hot doctor blade to provide a coating thickness of about 7 mils. The unmodified polyethylene (Sample 1) did not stick to the paperboard. Samples 2 through 7 adhered well to the paperboard and fiber tear resulted when an attempt was made to pull the film from the paperboard.

EXAMPLE 3

Four 100 pound blends (Samples 8 through 11) were prepared in an extruder. The compositions of the blends were as follows:

Sample 8 Polyethylene having a melt viscosity of 36,000 cp. at 190°C. and a density of 0.913, and about 2.5 percent maleated polypropylene having a saponification number of 53.5 and a melt viscosity of 360 cp. at 190°C. and about 0.25 percent pentaerythritol tetrakis[3-(3,5-di-tert-butyl-4-hydroxyphenyl)propionate]. (Melt viscosity of the blend was 20,000 cp. at 190°C.)

Sample 9 Polyethylene having a melt viscosity of 36,000 cp. at 190°C. and a density of 0.913, and about 2.5 percent maleated polypropylene having a saponification number of 53.5 and a melt viscosity of 360 cp. at 190°C. and about 0.5 percent pentaerythritol tetrakis[3-(3,5-di-tert-butyl-4-hydroxyphenyl)propionate]. (Melt viscosity of the blend was 24,000 cp. at 190°C.)

Sample 10 Polyethylene having a melt viscosity of 36,000 cp. at 190°C. and a density of 0.913 and about 5 percent maleated polypropylene having a saponification number of 53.5 and a melt viscosity of 360 cp. at 190°C. and about 0.25 percent pentaerythritol tetrakis[3-(3,5-di-tert-butyl-4-hydroxyphenyl)propionate]. (Melt viscosity of the blend was 23,000 cp. at 190°C.)

Sample 11 Polyethylene having a melt viscosity of 36,000 cp. at 190°C. and a density of 0.913 and about 5 percent maleated polypropylene having a saponification number of 53.5 and a melt viscosity of 360 cp. at 190°C. and about 0.5 percent pentaerythritol tetrakis[3-(3,5-di-tert-butyl-4-hydroxyphenyl)propionate]. (Melt viscosity of the blend was 28,000 cp. at 190°C.)

All four blends processed well in the curtain coating machine at a melt temperature of 360°F. (182°C.). Good color was retained, the curtain remained free from gel particles, and no increase in melt viscosity was observed when these four blends were circulated in the curtain coating machine for four hours. Automatic head gaskets, small toy cars, and steaks were packaged with a film thickness of about 5 mils. Good adhesion (fiber tear) was achieved when the paperboard support was plain white and unprinted or when it was printed. Printing on the paperboard was readily visible through the 5 mil film thickness. Free films (5 mil thickness) made from these blends had good tensile strength (1,000–1,050 psi.) and high elongation (100 percent). Good adhesion was achieved when honeycomb cushioning material was made from these blends with a paper backing. Only about 6 pounds of polyethylene was needed to flush out the machine at the end of each run.

EXAMPLE 4

A blend of polyethylene having a melt viscosity of 4,000 cp. at 190°C., and a density of 0.906 with 6 weight percent maleated polypropylene having a saponification number of 15, a melt viscosity of 30,000 cp. at 190°C. is prepared by melt blending. Stabilizers present in the blend include 0.1 weight percent dilauryl thiodipropionate and 0.1 weight percent dioctadecyl-p-cresol. This blend has a melt viscosity of 4,400 cp. at 190°C., good color, and is readily coated on paper and 3-D pictures with a thickness of 10 mils. These coatings have good adhesion to the paper and to the pictures.

EXAMPLE 5

A blend of polyethylene having a melt viscosity of 480 cp. at 125°C. and a density of 0.921 containing 10 weight percent maleated polypropylene having a saponification number of 32, a melt viscosity of 600 cp. at 190°C. and 0.25 weight percent pentaerythritol tetrakis-[3-(3,5-di-tert-butyl-4-hydroxyphenyl)propionate] is prepared by stirring the melt at 160°C. When this blend is applied to corrugated cardboard cartons to provide a coating with a thickness of 1 mil, the cartons have good resistance to water.

Table 1

Stability of Polyethylene/Maleated Polypropylene Blends in Brabender Plastograph[a]

| Sample | Polyethylene Having a Density of 0.913 and a Melt Viscosity of 36,000 cp. at 190°C., G. | Maleated Polypropylene Having a Sap. No. of 45, and a Melt Viscosity of 1300 cp. at 190°C., G. | Irganox 1010, G.[b] | Torque Initial | Torque Final | Condition of Melt at End of Run |
|---|---|---|---|---|---|---|
| 1 (Control) | 35 | 0 | 0 | 140 | 175 (36 min.) | Good color, viscous |
| 2 | 33.25 | 1.75[c] | 0.035[d] | 140 | 175 (3 hr. 11 min.) | Good, very fluid |
| 3 | 33.25 | 1.75[c] | 0.07[e] | 135 | 150 (7 hr.) | Good, very fluid |
| 4 | 34.1 | 0.9[f] | 0.0875[g] | 160 | 160 (7 hr.) | Good, very fluid |
| 5 | 33.25 | 1.75[c] | 0.0875[g] | 155 | 155 (7 hr.) | Good, very fluid |
| 6 | 34.1 | 0.9[f] | 0.175[h] | 155 | 155 (7 hr.) | Good, very fluid |
| 7 | 33.25 | 1.75[c] | 0.175[h] | 145 | 155 (7 hr.) | Good, very fluid |

[a] Melt temperature 190°C., rotor speed 177 rpm.
[b] Pentaerythritol tetrakis[3(3,5-di-tert-butyl-4-hydroxyphenyl)propionate]
[c] 5 wt. % based on total blend.
[d] 0.1 wt. % based on total blend.
[e] 0.2 wt. % based on total blend.
[f] 2.5 wt. % based on total blend.
[g] 0.25 wt. % based on total blend.
[h] 0.5 wt. % based on total blend.

EXAMPLE 6

A blend of polyethylene having a melt viscosity of 4000 cp. at 190°C. and a density of 0.906 with 5 weight percent maleated polypropylene having a saponification number of 45, a melt viscosity of 500 cp. at 190°C. is prepared by melt blending. This blend has a melt viscosity of 3,400 cp. at 190°C. and has the following adhesion properties when used as a hot melt adhesive:

| | |
|---|---|
| Paper-to-Paper Peel, g. | 75 |
| Hot Tack, sec. | 7 |
| Open Time, sec. | 8 |
| Pop-open temperature, °C. | |
| 1″ | 98 |
| 2″ | 102 |

EXAMPLE 7

A blend of polyethylene having a melt viscosity of 36,000 cp. at 190°C. and a density of 0.913 with 5 weight percent maleated polypropylene having a saponification number of 45, a melt viscosity of 500 cp. at 190°C. is prepared by melt blending. This blend has a melt viscosity of 30,500 cp. at 190°C. and has the following adhesion properties when used as a hot melt adhesive:

| | |
|---|---|
| Paper-to-Paper Peel, g. | 255 |
| Hot Tack, sec. | 5 |
| Open Time, sec. | 5 |
| Pop-open temperature, °C. | |
| 1″ | 110 |
| 2″ | 110 |

The blends of the present invention can be used as coating resins for coating paperboard. The treated paperboard can be used in making cartons, such as milk cartons. These blends can also be used as a curtain coating resin for packaging articles, such as toys, and automobile parts by affixing the article to a paperboard support. These blends can also be used as hot melt adhesives to seal cartons, packages, and the like.

The invention has been described in detail with particular reference to certain preferred embodiments thereof, but it will be understood that variations and modifications can be effected within the spirit and scope of the invention.

We claim:

1. A blend containing polyethylene, useful as an adhesive and coating composition, comprising a blend of (1) polyethylene having a melt viscosity of from 100 to 100,000 cp. at 190°C. and a density of from about 0.90 to about 0.94 and (2) about 0.5 to 25 percent by weight of modified polyolefin prepared from monoolefins having at least 3 carbon atoms, prepared by reacting a thermally degraded polyolefin with an unsaturated polycarboxylic acid, said modified polyolefin having a saponification number of 6–60, and a melt viscosity of 100 to 150,000 cp. at 190°C.

2. A blend containing polyethylene according to claim 1 containing 1 to 10 percent by weight modified polyolefin.

3. A blend containing polyethylene of claim 2 wherein said modified polyolefin is maleated polypropylene.

4. A blend containing polyethylene of claim 3 wherein said maleated polypropylene has a saponification number of 30–60 and a melt viscosity of 300–600 cp. at 190°C.

5. A blend containing polyethylene of claim 4 wherein said maleated polypropylene has a saponification number of about 53.5 and a melt viscosity of 360 cp. at 190°C.

6. A blend containing polyethylene of claim 5 wherein said polyethylene has a melt viscosity of 36,000 cp. at 190°C. and a density of about 0.913.

7. A blend containing polyethylene of claim 6 containing from about 0.25 to 0.5 percent by weight pentaerythritol tetrakis[3-(3,5-di-tert-butyl-4-hydroxyphenyl)propionate].

* * * * *